United States Patent [19]

Wadsworth

[11] Patent Number: 4,807,343
[45] Date of Patent: Feb. 28, 1989

[54] TUBELESS TIRE VALVE STEM INSERTER
[75] Inventor: Thomas P. Wadsworth, Clyde, Ohio
[73] Assignee: Chemi-Trol Chemical Company, Fremont, Ohio
[21] Appl. No.: 85,344
[22] Filed: Aug. 14, 1987
[51] Int. Cl.⁴ .............................................. B23P 19/04
[52] U.S. Cl. ..................................... 29/221.5; 29/235; 29/451; 152/427; 227/142
[58] Field of Search .............. 29/450, 451, 235, 213 R, 29/221.5, 249; 152/427; 227/142

[56] References Cited

U.S. PATENT DOCUMENTS

| | | | |
|---|---|---|---|
| 1,466,992 | 9/1923 | Craun | 29/249 |
| 1,552,645 | 9/1925 | Powell | 29/235 X |
| 1,601,324 | 9/1926 | Reynolds | 227/142 |
| 2,430,532 | 11/1947 | Rayburn | 227/142 |
| 2,438,642 | 3/1948 | Martin | 29/235 |
| 2,866,492 | 12/1958 | Lee | 152/427 |
| 3,387,354 | 6/1968 | Massberg | 29/221.5 |
| 3,750,258 | 8/1973 | Sampo | 29/221.5 |
| 3,852,839 | 12/1974 | Blessing | 29/221.5 X |

FOREIGN PATENT DOCUMENTS 566155 8/1957 Italy .................................... 227/142

Primary Examiner—Charlie T. Moon
Attorney, Agent, or Firm—Richard C. Darr

[57] ABSTRACT

A tool for installing valve stems in the rims for tubeless tires from the outside of the rim. The tool includes a cylindrical barrel having a tip for insertion in the opening in the rim, the interior walls of the barrel converging toward the tip end. The barrel is removably affixed to an actuating mechanism including a push rod adapted to be advanced and retracted within the barrel. The forward end of the push rod has an internally threaded fitting for mating with the threaded end of conventional tubeless tire valve stems. The actuating mechanism may be operated to incrementally advance the push rod, and thereby a valve stem affixed thereto, along the converging barrel to eject the valve stem through the barrel tip and seat it within the opening in the rim. An indicia may be provided on the push rod for visually indicating the axial position of the valve stem.

8 Claims, 2 Drawing Sheets

TUBELESS TIRE VALVE STEM INSERTER

BACKGROUND OF THE INVENTION

1. Field of the Invention

The present invention relates broadly to installation of valve stems for tubeless tires, and more particularly to a tool for externally inserting a valve stem into the rim of a tubeless tire assembly.

2. Description of the Prior Art

In recent years so-called tubeless tires have largely replaced the tire and separate inner tube arrangement employed earlier. In the earlier arrangement the inner tube included a valve stem which was adapted to extend through an opening in the rim for inflation of the tube. In the tubeless tire and rim assembly, the inner tube is eliminated and the tire is so constructed as to form an air-tight seal with the rim. A separate valve stem is sealingly seated in the opening in the rim for inflation of the tire.

Such valve stems generally comprise a metal tube disposed within and bonded to a rubber sleeve. The rubber sleeve has at its inner end an enlarged flange or base adapted to sealingly engage at least the interior surface of the rim around the opening as air pressure is applied thereto. The metal tube projects beyond the rubber sleeve at the outer end and is provided with external threads for retaining a valve cap. Heretofore the valve stems have generally been installed by inserting them through the opening from the inside of the rim and pulling them into position from the outside. Various tools are known in the art for installing valve stems in this manner. Such tools as disclosed, for example, in U.S. Pat. No. 3,852,839 to Blessing, generally include an elongated member threaded for attachment to the valve stem and by which the valve stem can be pulled into seated position within the opening in the rim.

In order to install a valve stem in this manner it is, of course, necessary that the tire be removed from the rim, or at least that the tire bead be broken free from the rim to provide access to the interior for insertion of the stem. Demounting and mouting of the tire requires specialized equipment and skilled personnel. In many instances a flat tire is due to failure of the valve stem itself, so that all that is necessary for repair of the tire is installation of a new valve stem. Heretofore it has nevertheless generally been necessary to demount the tire to install the valve stem, resulting in an undue expenditure of time and money. Various tubeless tire valves have been developed with specific configurations for installation from the exterior of the rim as disclosed, for example, in U.S. Pat. Nos. 2,866,492 to Lee, 2,872,963 to Boyer, 3,863,697 to Brown and 4,016,918 to Thacker. Such devices have not proven entirely satisfactory. Furthermore, their use for repair purposes would require that a repair shop carry an inventory of the special repair valves in addition to the standard valves. Thus, it would be highly advantageous to be able to quickly and easily insert standard valve stems from the exterior of the rim. U.S. Pat. No. 3,798,738 to Purtell discloses a device for inserting so-called mushroom drainage valves in irrigation pipe from the exterior of the pipe. The drainage valves are of a completely different construction, so that the device would not be suitable for inserting tubeless tire valve stems in the manner of the present invention.

SUMMARY OF THE INVENTION

In accordance with the present invention, there is provided a tool for installing valve stems in the rims for tubeless tires from the outside of the rim. The tool includes a cylindrical barrel having a tip for insertion in the opening in the rim. The interior walls of the barrel converge toward the tip end, and the barrel is removably affixed to an actuating mechanism including a push rod adapted to be advanced and retracted within the barrel. The forward end of the push rod has an internally threaded fitting for mating with the threaded end of conventional tubeless tire valve stems. With a valve stem affixed to the push rod, the actuating mechanism may be operated to incrementally advance the push rod, and thereby the valve stem, along the converging barrel to eject it through the barrel tip and seat it within the opening in the rim. An indicia is provided on the push rod for visually indicating the point at which the rod has advanced sufficiently to insure that the valve stem is properly seated with its lower flange or base inside the rim.

It is, therefore, a primary object of the invention to provide a device for installing valve stems in the rims for tubeless tires.

Another object of the invention is to provide a tool adapted to insert valve stems for tubeless tires with the tire mounted upon the rim.

Another object of the invention is to provide such a tool capable of installing various standard sizes of tubeless tire valve stems.

Still another object is to provide such a tool by means of which a relatively unskilled person can quickly, easily and precisely install replacement tubeless tire valve stems without demounting the tire or breaking it free from the rim.

Other objects and advantages will become more apparent during the course of the following description, when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENTS

Figure 1:
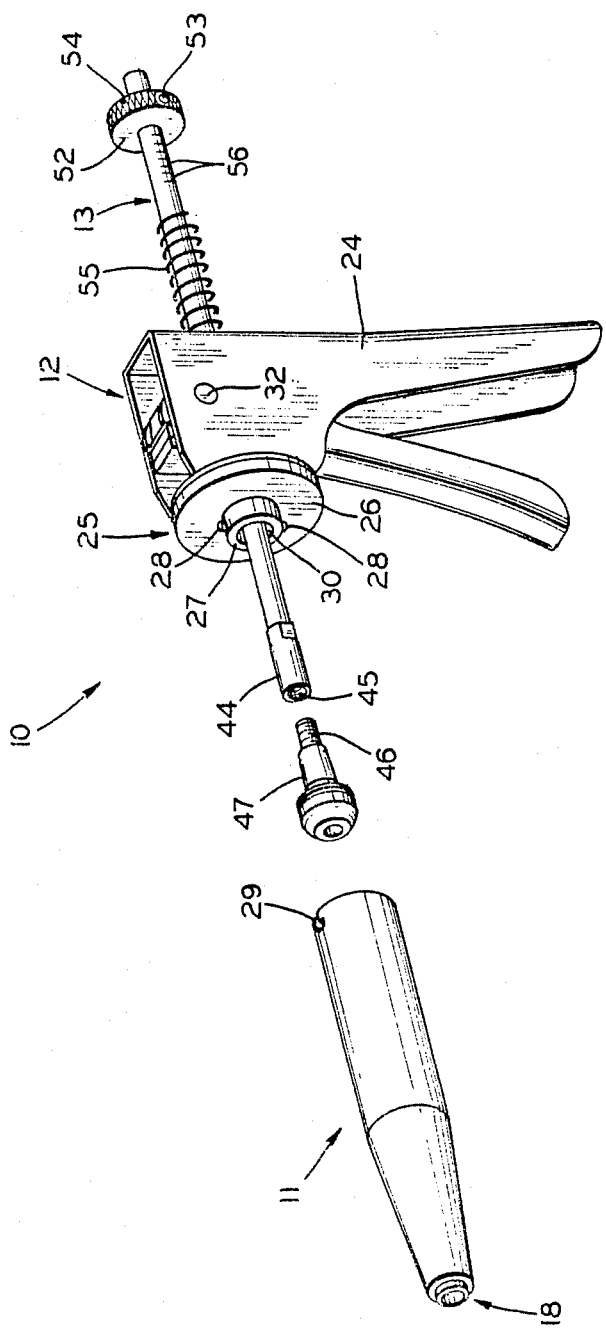
FIG. 1 is an exploded perspective view of the valve stem installing tool.

Referring now to the drawings, there is shown generally at 10 a valve inserting tool constructed in accordance with the invention. More particularly the valve inserting tool includes a tubular barrel 11 removably affixed to a handle mechanism 12 within which is carried a reciprocable push rod or shaft 13. The illustrated handle mechansim 12 employs a trigger arrangement of the type commonly utilized in caulking guns for advancing the push rod as will be hereinafter more fully explained. However it is fully contemplated that other and different types of equipment may be employed with the handle mechanism for advancing and retracting the push rod. For example, a number of types of equivalent trigger systems are available, or the handle mechanism might employ a rotary lever in conjunction with a threaded push rod. It might also incorporate an air cylinder with the push rod 13 connected to the piston thereof.

Figure 2:
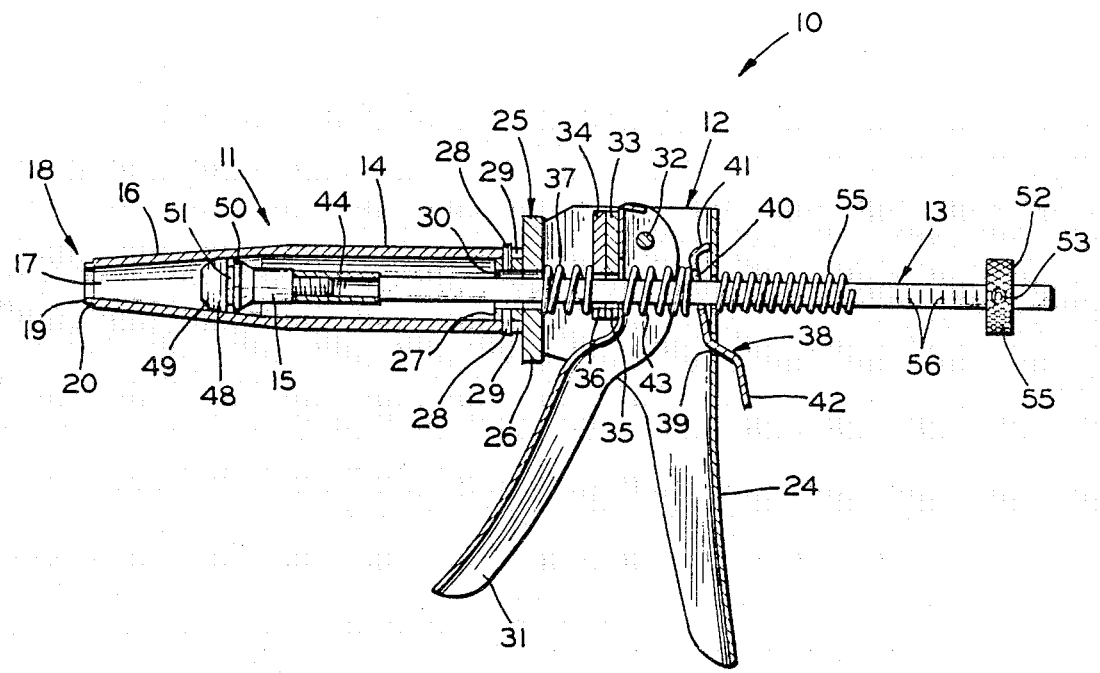
FIG. 2 is a longitudinal sectional view of the invention.
Figure 3:
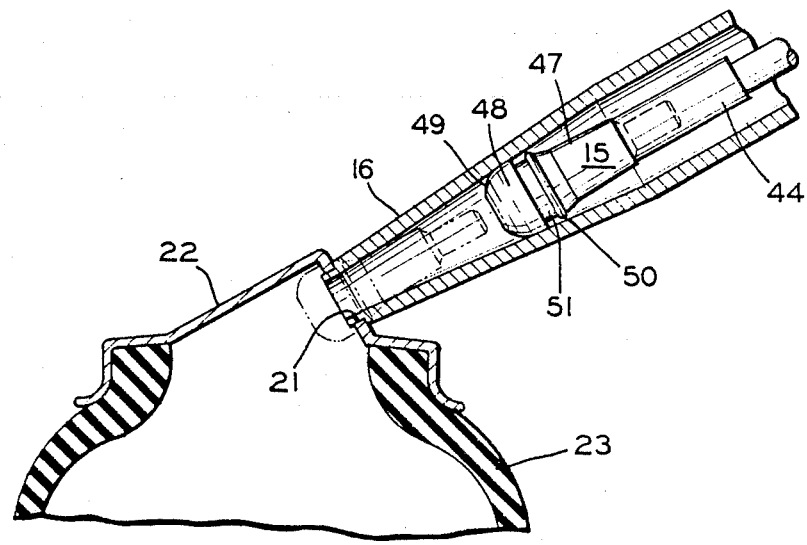
FIG. 3 is an enlarged fragmentary view, illustrating the end of the barrel of the device of FIG. 2 in position for inserting a valve stem in a rim.

As best illustrated in FIGS. 2 and 3, the tubular barrel 11 comprises a cylindrical loading section 14 having an inside diameter sufficiently large to readily accommodate a valve stem 15, and a funnel-shaped exit section 16 whose walls converge toward an exit orifice 17 to compress the base of the valve stem as it is advanced prior to ejection. The exit section 16 is formed at the end with a tip 18 of reduced external diameter. More particularly, the tip comprises a reduced diameter flange 19 projecting from the end of the funnel shaped section 16 so as to define an annular end bearing wall 20 thereon. The flange 19 is so dimensioned as to be received within a conventional valve stem opening 21 in a rim 22 for a tubeless tire 23. The width of the flange 19 is approximately equal to the thickness of the rim material so that, as seen in FIG. 3, with the annular end bearing wall 20 seated against the rim, the end of the flange will be approximately flush with the inner surface of the rim 22. Thus, as will be hereinafter more fully explained, as the compressed base of the valve stem 15 emerges from the orifice 17 it will seat against the interior surface of the rim.

The handle mechanism 12 includes a pistol-type grip 24 of generally rectangular configuration by which the tool is held while in use. The grip is open at the top and bottom and carries at its forward end a coupler, indicated generally at 25, for affixing the barrel 11. The coupler more specifically comprises a base plate 26 with a mounting flange 27 projecting forwardly therefrom adapted to be received in the end of the entry section 14 of the tubular barrel 11. Diametrically opposed pins 28 projecting from the mounting flange cooperate with mating bayonet slots 29 in the barrel in the conventional manner to releasably couple the barrel to the handle mechanism. It is contemplated that alternatively the interior of the barrel may be provided with threads for mating with complementary threads on the mounting flange 27 whereby the barrel may be removably coupled to the handle mechanism. A central aperture 30 is provided in the base plate and mounting flange for passage of the push rod 13.

A trigger 31 positioned forwardly of the grip 24 is pivotally mounted within the grip above the push rod upon a transversely extending shaft 32. First and second push rod drive grips 33 and 34, located forwardly of the upper portion of the trigger 31 and in operational contact with the trigger have openings 35 and 36, respectively, through which the push rod loosely passes. A compression spring 37 surrounding the push rod between the base plate 26 and second push rod drive grip 34 urges the drive grips against the trigger. A release lever 38 extending through an aperture 39 in the rear wall of the pistol-type grip 24 has an opening 40 through which the push rod 13 loosely passes. The release lever has a rearwardly extending lip 41 which bears against the grip 24 to serve as a fulcrum for the lever, and a thumb tab 42 by which it can be manually depressed to release type push rod. A coil spring 43 surrounding the push rod bears against the trigger 31 and the release lever 38 to normally urge the trigger forward and the release lever rearwardly to a canted position where-at it grips the push rod 13 around the opening 40 in the conventional manner and prevents rearward movement of the push rod.

Conventional tubeless tire valve stems are generally available in a number of standard lengths to serve different applications. Thus, for example, there may be four standard lengths for automobile valve stems and two standard lengths for truck stems. The push rod 13 of the invention serves both to advance the valve stem 15 through the insertion tool and into the rim, and to provide a visual indication of the point at which the stem is properly positioned with respect to the rim. To that end, the push rod or shaft 13 is of some what greater length than the assembled tubular barrel 11 and handle mechanism 12. At its forward end there is affixed to the push rod a fitting 44 internally threaded as at 45 for receiving the threaded end of the barrel 46 of the valve stem 15. Such valve stems conventionally include a resilient sleeve 47 bonded to the barrel and having an enlarged base 48 with tapered walls 49, and an annular flange 50 spaced therefrom and defining a recess 51 between the flange and enlarged base. The recessed area has a diameter similar to the diameter of the opening 21 in the rim 22, and the width of the recess is equivalent to the wall thickness of the rim.

The push rod or shaft 13 is of sufficient length to extend rearwardly beyond the grip 24 for some distance with the shaft fully advanced for insertion of a valve stem. An adjustable knob 52 carried on the push rod has a set screw 53 by which it may be affixed at selected positions along the push rod. The knob is utilized in turning the pushrod for connecting it to an disconnecting it from the valve stem, and to that end may be provided with a knurled surface 54. A compression spring 55 encircles the push rod between the grip 24 and the knob 52. The spring may serve to indicate the position of the valve stem as well as to retract the push rod when the release lever 38 is depressed. Thus, by suitably locating the knob 52 along the push rod, it can be positioned to indicate that a particular length valve stem is properly seated in the rim when the knob first engages the spring 55 against the grip 24, or when it has fully compressed the spring. To assist in setting the knob, there may be provided on the push rod a series of index marks 56 indicating where the knob should be positioned for each standard length valve stem. Alternatively, the index marks themselves may be so positioned on the push rod to visually indicate directly, either relative to the spring 55 or to the grip 24, when the rod has been advanced sufficiently to permit seating of the valve stem.

Reviewing briefly operation of the invention, in order to install a valve stem the barrel 11 is removed from the handle mechansim 12 by turning counterclockwise and separating to disengage the pins 28 from the bayonet slots 29. An appropriate valve stem 15 is then attached to the push rod 13 by screwing the end of the barrel 46 into the fitting 44. A lubricant, such as ordinary lubricating grease or pertroleum jelly, is preferably applied to the enlarged base 48 and tapered walls 49 of the valve stem to facilitate passage of the valve stem through the funnel shaped exit section 16 of the barrel 11. The barrel is then re-attached to the handle mechanism, care being taken to insure that the push rod and attached valve stem are sufficiently retracted to readily permit locking of the pins 28 in the bayonet slots 29 without the base 48 being compressed within the funnel section 16. The knob 52 is then set axially along the push rod or shaft 13 at the appropriate location for the particular valve stem affixed thereto if the knob is to be used as the visual indicator or, as described above, the index marks 56 may be utilized directly to indicate the depth of insertion of the valve stem.

The tip 18 of the tool is then placed against the rim with the flange 19 in the opening 21 and the annular end bearing wall 20 held securely against the surface of the rim. The trigger 31 of the grip 24 is operated in the usual manner to incrementally advance the push rod or shaft 13. Thus, as will be apparent in FIG. 2, when the trigger is pulled back the drive grips 33 and 34 are canted forwardly to grip the push rod and cause it to advance. When the trigger is released the compression spring 37 urges the grips 33 and 34 back to an upright position and the trigger to its forward position. The release lever 38 grips the push rod to prevent it form retracting.

Repeated operation of the trigger 31 thus causes the push rod to advance the valve stem 15 along the barrel and the funnel shaped exit section 16 thereof, in turn compressing the enlarged base 49. As illustrated in FIG. 3, the valve stem moves along the funnel-shaped section 16 from the solid line position and, as it reaches the position shown in broken lines, the enlarged base 48 moves out of the exit orifice 17 and snaps into position against the inside surface of the rim. The operator will not only be able to feel when the base has seated inside the rim since the valve stem can not be easily withdrawn, but will also be able to visually observe from the position of the knob 52 and/or the index marks 56 when the base is in position, whereupon advancement of the valve stem is discontinued with the annular flange 50 still within the barrel. With the base 48 inside the rim, the release lever 38 is depressed to allow the push rod 13 to retract and pull the base securely against the rim. The trigger 31 may again be operated to eject the remainder of the valve stem from the barrel. As it emerges from the exit orifice, the annular flange 50 seats against the outer surface of the rim, and the walls of the recess 51 expand outwardly to engage the walls of the valve stem opening 21 to complete the installation of the valve stem as shown in broken line in FIG. 3. The push rod is then rotated by means of the knob 52 to unscrew the valve stem from the fitting 44.

It is to be understood that the forms of the invention herewith shown and described are to be taken as preferred embodiments of the same, but that various changes in the shape, size and arrangement of parts may be reserted to without departing form the spirit of the invention.

What is claimed is:

1. A tool for inserting a tubeless tire valve stem having an enlarged base into the opening of a rim from the exterior of the rim, comprising a tubular barrel having an exit orifice defined by an end thereof, which end is adapted to mate with said opening, said tubular barrel including a loading section and a funnel-shaped exit section gradually decreasing in diameter from said loading section to said exit orifice, shaft means adapted to extend axially within said tubular barrel, including means for releasably connecting said shaft to said valve stem, and means for advancing said shaft axially within said tubular barrel to thereby advance said valve stem along said exit section and eject said base through said orifice into said opening, said means for advancing said shaft including a handle mechanism removably affixed to said loading section of said tubular barrel to permit the affixing of different size barrels to said handle mechanism for different standard size valve stems, a trigger pivotally mounted in said handle mechanism, said trigger being operatively connected to said shaft whereby said shaft is incrementally advanced upon each retraction of said trigger, and including index means on said shaft for indicating in cooperation with said handle mechanism the position at which said shaft has been advanced sufficiently to eject said base through said orifice and seat it in said opening for each of several diffrent standard length stems.

2. A tool for inserting a tubeless tire valve stem as claimed in claim 1, wherein said tubular barrel includes a tip of reduced external diameter adapted to be received within said opening whereby said exit orifice mates with said opening.

3. A tool for inserting a tubeless tire valve stem as claimed in claim 2, wherein said tip comprises a flange of reduced diameter projecting from the end of said funnel-shaped exit section and defining an annular end bearing wall on said end supporting said flange.

4. A tool for inserting a tubeless tire valve stem as claimed in claim 3, wherein the external diameter of said flange is substantially equal to the diameter of said opening, and the width of said flange is substantially equal to the thickness of the rim in the area surrounding said opening.

5. A tool for inserting a tubeless tire valve stem as claimed in claim 1, wherein said valve stem includes an externally threaded end and said means for releasably connecting said shaft to said valve stem includes an internally threaded fitting at the end of said shaft for receiving the threaded end of said valve stem.

6. A tool for inserting a tubeless tire valve stem as claimed in claim 1, wherein said index means comprises a series of spaced marks on said shaft, each said mark indicating the position of the base of a different on of the standard lengths of said valve stems relative to said orifice.

7. A tool for inserting a tubeless tire valve stem as claimed in claim 1, wherein said valve stem includes an externally threaded end portion and said means for releasably connecting said shaft to said valve stem includes an internally threaded fitting at the end of said shaft adapted to mate with the threaded end of said valve stem, and said index means comprises a knob adjustable positionable along said shaft behind said handle mechanism, said knob being adapted for setting at selected positions along said shaft to indicate the position of the base of a different one of the standard lengths of said valve stems relative to said orifice, and for rotating said shaft about its longitudinal axis to connect and disconnect said shaft and valve stem.

8. A tool for inserting a tubeless tire valve stem as claimed in claim 1, including a base plate on said handle mechanism, a mounting flange extending outwardly from said base plate for insertion into the end of said loading section of said tubular barrel, at least one pin projecting radially outwardly from said mounting flange, and a locking slot in the wall of said tubular barrel for receiving said pin and releasably connecting said tubular barrel to said handle mechanism.

* * * * *